(12) United States Patent
Unger et al.

(10) Patent No.: US 12,097,570 B2
(45) Date of Patent: Sep. 24, 2024

(54) ULTRASONIC TOOL AND ULTRASONIC CONNECTION DEVICE HEREIN

(71) Applicant: Hesse GmbH, Paderborn (DE)

(72) Inventors: Andreas Unger, Verl (DE); Michael Broekelmann, Delbrueck (DE); Matthias Hunstig, Paderborn (DE); Hans-Juergen Hesse, Paderborn (DE)

(73) Assignee: Hesse GmbH, Paderborn (DE)

( * ) Notice: Subject to any disclaimer, the term of this patent is extended or adjusted under 35 U.S.C. 154(b) by 151 days.

(21) Appl. No.: 17/691,924

(22) Filed: Mar. 10, 2022

(65) Prior Publication Data

US 2022/0193816 A1  Jun. 23, 2022

Related U.S. Application Data

(63) Continuation of application No. PCT/DE2020/100794, filed on Sep. 11, 2020.

(30) Foreign Application Priority Data

Sep. 11, 2019  (DE) .................. 10 2019 124 332.7
Sep. 11, 2019  (DE) .................. 10 2019 124 333.5
(Continued)

(51) Int. Cl.
*B23K 20/00*  (2006.01)
*B06B 1/02*  (2006.01)
(Continued)

(52) U.S. Cl.
CPC ............. *B23K 20/106* (2013.01); *B06B 1/02* (2013.01); *B23K 20/004* (2013.01);
(Continued)

(58) Field of Classification Search
CPC ............ B23K 20/10–106; B23K 20/26; B23K 20/004; B23K 20/005; B23K 20/007;
(Continued)

(56) References Cited

U.S. PATENT DOCUMENTS 5,240,166 A * 8/1993 Fontana, Jr. ........... B23K 20/10
228/111.5
5,298,715 A * 3/1994 Chalco ................. B23K 1/0056
219/121.64
(Continued)

FOREIGN PATENT DOCUMENTS

CN  105880852 A  *  8/2016  ............. B23K 20/10
CN  106102956 A  *  11/2016  ............. B21D 39/03
(Continued)

OTHER PUBLICATIONS

International Search Report dated Jan. 29, 2021 in corresponding application PCT/DE2020/100794.
(Continued)

*Primary Examiner* — Kiley S Stoner
(74) *Attorney, Agent, or Firm* — Muncy, Geissler, Olds & Lowe, P.C.

(57) ABSTRACT

An ultrasonic tool comprising a first end face and a second end face, which is opposite the first end face, as well as a tool cover surface connecting the first end face and the second end face, wherein the ultrasonic tool is elongated in a longitudinal direction of the tool, wherein at least the first end face is formed as a connecting contact surface, which is arranged for pressing the ultrasonic tool against a connecting component, and wherein the ultrasonic tool comprises an end region comprising the connecting contact surface, which extends from the connecting contact surface in the longitudinal direction of the tool over 15 mm, but at most extends one third of the length of the ultrasonic tool in the direction of the opposite end face, and wherein in the end region, a (Continued)

first partial surface of the tool cover surface is formed as a surface-structured absorption surface.

23 Claims, 11 Drawing Sheets

(30) Foreign Application Priority Data

Sep. 11, 2019 (DE) ...................... 10 2019 124 334.3
Sep. 11, 2019 (DE) ...................... 10 2019 124 335.1

(51) Int. Cl.
*B23K 20/10* (2006.01)
*B23K 101/38* (2006.01)
*B23K 103/10* (2006.01)
*B23K 103/12* (2006.01)

(52) U.S. Cl.
CPC ...... *B23K 2101/38* (2018.08); *B23K 2103/10* (2018.08); *B23K 2103/12* (2018.08)

(58) Field of Classification Search
CPC ............ B23K 2101/38; B23K 2103/10; B23K 2103/12; B23K 1/06; B23K 65/645; H01L 2224/78252; H01L 2224/78263; B06B 1/02; B06B 2201/55; B06B 2201/72; B06B 1/06
USPC .... 228/180.5, 4.5, 1.1, 110.1, 904, 102–105, 228/8–12
See application file for complete search history.

(56) References Cited

U.S. PATENT DOCUMENTS

| | | | | |
|---|---|---|---|---|
| 6,676,778 | B1* | 1/2004 | Tuchiya | G11B 5/4826 360/234.6 |
| 7,980,444 | B2* | 7/2011 | Ebihara | H05K 13/046 228/49.5 |
| 2009/0212089 | A1* | 8/2009 | Christopherson, Jr. | B29C 66/81429 419/36 |
| 2013/0270230 | A1* | 10/2013 | Cheung | H01L 24/75 228/180.21 |
| 2014/0112107 | A1 | 4/2014 | Guo et al. | |
| 2015/0174818 | A1 | 6/2015 | Mayer et al. | |

FOREIGN PATENT DOCUMENTS

| | | | | |
|---|---|---|---|---|
| CN | 106735967 | A * | 5/2017 | ............ B23K 20/10 |
| CN | 110476237 | A * | 11/2019 | ............ B23K 26/18 |
| DE | 102012112413 | A1 * | 6/2014 | ........... B23K 20/005 |
| DE | 102017129546 | A1 | 6/2019 | |
| DE | 102019124332 | A1 * | 3/2021 | ............... B06B 1/02 |
| DE | 102019124335 | A1 * | 3/2021 | ........... B23K 20/004 |
| EP | 0367705 | A2 * | 5/1990 | |
| EP | 0947281 | A2 * | 10/1990 | |
| JP | H05259220 | A | 10/1993 | |
| JP | 2002118152 | A * | 4/2002 | ............ B29C 65/08 |
| KR | 20110077626 | A * | 7/2011 | |

OTHER PUBLICATIONS

International Preliminary Report on Patentability dated Mar. 24, 2022 in corresponding application PCT/DE2020/100794.

* cited by examiner

ULTRASONIC TOOL AND ULTRASONIC CONNECTION DEVICE HEREIN

This nonprovisional application is a continuation of International Application No. PCT/DE2020/100794, which was filed on Sep. 11, 2020, and which claims priority to German Patent Application No. 10 2019 124 332.7, which was filed in Germany on Sep. 11, 2019, and German Patent Application No. 10 2019 124 333.5, which was filed in Germany on Sep. 11, 2019, and German Patent Application No. 10 2019 124 334.3, which was filed in Germany on Sep. 11, 2019, and German Patent Application No. 10 2019 124 335.1, which was filed in Germany on Sep. 11, 2019, and which are all herein incorporated by reference.

BACKGROUND OF THE INVENTION

Field of the Invention

The present invention relates to an ultrasonic tool comprising a first end face and a second end face, which is opposite the first end face, as well as a tool cover surface connecting the first end face and the second end face, wherein the ultrasonic tool is elongated in a longitudinal direction of the tool, wherein at least the first end face is formed as a connecting contact surface, which is arranged for pressing the ultrasonic tool against a connecting component, and wherein the ultrasonic tool comprises an end region comprising the connecting contact surface, which extends from the connecting contact surface in the longitudinal direction of the tool over 15 mm, but at most extends one third of the length of the ultrasonic tool established in the longitudinal direction of the tool, in the direction of the opposite end face. The invention also relates to an ultrasonic connection device comprising an ultrasonic tool, an ultrasonic generator, a transducer, and a laser generator for providing a laser beam.

Description of the Background Art

A generic ultrasonic tool is used, for example, in ultrasonic bonding or ultrasonic welding. The ultrasonic tool is excited to vibrations, for example to torsional vibrations, bending vibrations or longitudinal vibrations, via the transducer, which in particular has piezoelectric transducers as vibration exciters. The vibration exciters, in turn, are controlled by the ultrasonic generator for excitation.

Aside from the classic ultrasonic tools, ultrasonic tools are known for laser-supported ultrasonic bonding or ultrasonic welding. Such tools are described, for example, in JP 5259220 A and DE 10 2017 129 546 A1, which is incorporated herein by reference. The ultrasonic tools comprise a longitudinal recess, which extends in the longitudinal direction of the tool, which extends from the second end face in the direction of the connecting contact surface or ends in the latter as a through recess. The laser beam provided by means of the laser generator is coupled into the longitudinal recess of the ultrasonic tool and passes through the longitudinal recess up to the end region comprising the connecting contact surface. In the end region, the longitudinal recess may have an absorption coating that counteracts the reflection of the laser beam in this area and promotes heating of the ultrasonic tool in the end region. For example, the longitudinal recess may be formed as a through recess that ends in the connecting contact surface. There, the laser beam exits the ultrasonic tool and impinges on the connecting component.

A disadvantage of the solutions described in the conventional art is that, depending on the structural and spatial conditions, coupling the laser beam into the longitudinal recess and replacing the ultrasonic tool can be difficult. In addition, when the laser beam impinges on the connecting component, vapors can form or particles can be released, so that contamination of the connecting component or its environment occurs.

SUMMARY OF THE INVENTION

It is therefore an object of the present invention to specify an improved ultrasonic tool for laser-supported ultrasonic bonding and/or welding as well as an ultrasonic connection device herewith.

To achieve the object, the invention is characterized in that in the end region a first partial surface of the tool cover surface is formed as a surface-structured absorption surface.

An advantage of the invention is that the suitability of the ultrasonic tool for laser-supported ultrasonic bonding or laser-supported ultrasonic welding is improved. The surface-structured absorption surface ensures, on the one hand, that a laser beam directed at it can be substantially absorbed, and otherwise diffusely reflected, with the result that a specular reflection is avoided and damage to surrounding components of the ultrasonic connection arrangement such as the optical components of the laser generator forming and/or guiding the laser beam (lenses, optical waveguides or the like), damage to the therefore sensitive connecting components and danger to persons is prevented. On the other hand, the surface-structured absorption surface improves the degree of absorption with the result that a high percentage of the energy supplied via the laser beam heats the ultrasonic tool and only a comparatively small percentage is reflected. In particular, the surface-structured absorption surface can be designed as a beam trap for an incident laser beam in such a way that the laser beam impinging on the absorption surface is reflected several times on the absorption surface and is always absorbed proportionately.

In addition, it has been shown that the surface is enlarged by the structuring. This causes the radiation intensity or the laser surface power density to decrease. This way, such a degradation or destruction of the ultrasonic tool itself is prevented, as are the loosening of particles and formation of vapors and, ultimately, the contamination of the connecting point. In addition, the absorption surface, since it is formed on the tool cover surface, i.e., on the outside of the ultrasonic tool, can be produced comparatively cost-effectively and with high quality or regularity.

The end region of the ultrasonic tool can be defined on the one hand by the connecting contact surface. On the other hand, the absorption surface is at least partially and preferably completely located in the end region and the end region has a maximum extension of 15 mm in the longitudinal direction of the tool, starting from the connecting contact surface, wherein the end region covers at most one third of a length of the ultrasonic tool. For very short ultrasonic tools, which are used, for example, in ultrasonic ball bonding, the end region can be shorter than 15 mm. For ultrasonic tools with a length of more than 45 mm, the end region is shorter than one third of the length of the ultrasonic tool.

The absorption coefficient of the absorption surface can be greater than the absorption coefficient of the tool cover surface outside the end region or as the absorption coefficient of a second partial surface of the tool cover surface in the end region. The first partial surface and the second partial surface can be adjacent to each other or be separated from each other, for example by another partial surface. Advantageously, the absorption capacity of the ultrasonic tool can be further improved and the heating of the ultrasonic tool, preferably adjacent to the connecting contact surface, can be facilitated.

The absorption surface can be regularly structured. Due to the regular structuring, the absorption capacity is essentially constant across the absorption surface. Temperature peaks are thus avoided, and unacceptably high local heating is prevented. In addition, the ultrasonic tool is easy to manufacture and scattering between the ultrasonic tools is low.

The ultrasonic tool can taper in the end region. For example, the ultrasonic tool becomes wedge-shaped. In any case, a cross-section established vertically to the longitudinal direction of the tool decreases in sections. Preferably, the outer dimensions of the ultrasonic tool in the direction of the connecting contact surface also continuously decrease.

The surface structure of the absorption surface can be formed as a microstructure. In particular, the depth of the microstructures established vertically to the tool cover surface is greater than 1 µm. The depth of the microstructures then approximately has the same dimension as the wavelength of the laser beam. Preferably, the depth of the microstructures is greater than 10 µm. The maximum depth of the microstructures amounts to 350 µm. Large depths or dimensions are no longer understood as microstructures in the context of the invention.

For example, the microstructures can be regularly designed and have, in particular, a recurring or intermittently shaped surface. The microstructures may also be irregular.

For example, the roughness of the microstructured first partial surface forming the absorption surface may be greater than the roughness of the second partial surface of the tool cover surface. For the purposes of the invention, the roughness characterizes an unevenness of the surface height of the first partial surface and the second partial surface of the tool cover surface. In the present case, reference is made to the Arithmetic Mean Roughness Value Ra of the partial surfaces, which is widely used in practice. The mean roughness value generally indicates the average distance of a measuring point—on the surface—from the mean line. within the reference path, the mean line intersects the real profile in such a way that the sum of the profile deviations in a parallel surface to the mean line is distributed over the length of the measured section. The mean roughness value thus corresponds to the arithmetic mean of the maximum deviation from the mean line.

For example, macroscopic surface structures with a depth of more than 350 µm may be present at the absorption surface. The macrostructures are preferably regular. Contour structures, in particular body edges of the ultrasonic tool, are not considered surface structures within the meaning of the invention.

The surface-structured absorption surface can comprise a coating. In particular, an absorption coating improving the absorption capacity may be provided. Advantageously, the speed in heating the ultrasonic tool can be further increased and the proportion of reflective laser radiation can be reduced.

The absorption surface can be macroscopically flat, that is, not curved. Advantageously, a flat absorption surface can be produced simply and therefore cost-effectively and comparatively accurately, i.e., in accordance with the default values.

The absorption surface can be oriented oblique to the longitudinal direction of the tool or the longitudinal center axis of the tool. Advantageously, the oblique arrangement of the absorption surface allows for the latter to be provided in the tapering end region of the ultrasonic tool, in the immediate vicinity of the connecting contact surface on the end face. The spatial proximity of the connecting contact surface and the absorption surface facilitate rapid heating of the end region of the ultrasonic tool.

The absorption surface can provide grooved surface structures or dot-shaped surface structures. The grooved or dot-shaped surface structures are comparatively simple and therefore cost-effective to manufacture. The grooved surface structures can be arranged in particular parallel structured and/or cross-structured. In particular, the grooved surface structures can extend transversely to the longitudinal direction of the tool.

The absorption surface can be symmetrically oriented to a longitudinal center plane of the tool receiving the longitudinal direction of the tool. Particularly advantageously, the longitudinal center plane of the tool is formed as a symmetry plane of the ultrasonic tool. Advantageously, the symmetry simplifies the production of the ultrasonic tool and the installation of the same in the ultrasonic connection device. In addition, the symmetry enhances the vibration behavior of the ultrasonic tool.

A shaping can be provided at the at least one connecting contact surface, with which the ultrasonic tool is pressed against the connecting component. In particular, a contact contour for the connecting component may be provided on the connecting contact surface of the ultrasonic tool. For example, as a contact contour, a V-shaped transverse recess for an aluminum or copper bond wire or a cushion and/or honeycomb structure for ultrasonic bonding or ultrasonic welding of flat parts such as aluminum strip material or lead frames made of copper sheet can be provided. By providing the shaping or contact contour, the regularity of the connecting contact surface is interrupted at least locally, and the connecting component can force- or form-fittingly be fixed on the ultrasonic tool.

The surface-structured absorption surface can be prepared by wire EDM, die-sinking EDM, electrochemical ablation, engraving, laser structuring or laser ablation and/or primary forming or by machining and, in particular cost-effectively, by grinding.

The ultrasonic tool can be formed at least in the end region of a carbide, of steel or of a ceramic, preferably of a tungsten carbide-based carbide or boron nitride. Particularly preferably, it has tungsten carbide in a cobalt matrix.

Also, an ultrasonic connection device for ultrasonic welding and/or ultrasonic bonding comprises: an ultrasonic tool according to the invention comprising at least one surface-structured absorption surface formed on the tool cover surface, an ultrasonic generator and a transducer, wherein the ultrasonic generator excites the transducer to vibrate, and the transducer interacts with the ultrasonic tool in such a way that the ultrasonic tool is excited to ultrasonic vibrations and, preferably, to ultrasonic bending vibrations, and a laser generator for providing a laser beam, wherein the laser beam is aligned with the end region of the ultrasonic tool in such a way that it preferably completely, and at least partially, impinges on the absorption surface formed there to heat the same.

The surface structure of the absorption surface can be formed as a microstructure. The depth of the microstructure is greater than a wavelength of the laser beam and preferably greater than the wavelength of the laser beam by a factor of 10 or more. Advantageously, studies have shown that such an adaptation of the microstructured absorption surface to the wavelength of the laser beam overall promotes the absorption capacity and thus leads to a rapid heating of the ultrasonic tool and a reduction in the undesirable reflection of the laser beam.

The wavelength of the laser beam can be matched in such a way to the material of the ultrasonic tool, the texture of the surface structure and/or the coating, that an absorption coefficient of the absorption surface of at least 0.81 and preferably of at least 0.86 and particularly preferably of at least 0.9 is provided. For example, this absorption coefficient can be achieved if a microstructure with a depth of at least 10 μm is provided as an absorption surface by laser ablation on an ultrasonic tool made of a tungsten carbide-based carbide (tungsten carbide in cobalt matrix), and a laser beam with a wavelength of about 1000 nm is used.

The laser beam can be aligned in such a way that it impinges on the absorption surface in an oblique, i.e., not perpendicular, manner with respect to the tool cover surface. Preferably, an acute angle is formed between the longitudinal direction of the tool and an incidence direction of the laser beam. Particularly preferably, the laser beam irradiates the absorption surface from above. Advantageously, the arrangement of the laser generator or the integration of individual parts of the laser generator in a movable positioning head of the ultrasonic connection device is advantageously simplified by the oblique alignment. In particular, lenses or optical waveguides for forming and guiding the laser beam can be provided on the positioning head and moved with it, while other components of the laser generator (for example, a laser source) are installed in a stationary manner. In addition, due to the oblique irradiation of the absorption surface on the tip of the tool, a large free space is formed, so that a collision with components of the connecting component is counteracted or flexibility in the movement of the positioning head is improved.

The ultrasonic connection device may have a measuring device set up for contactless temperature measurement, wherein the measuring device is associated with the ultrasonic tool in such a way that the temperature measurement is carried out in the end region of the ultrasonic tool and preferably in the absorption surface.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
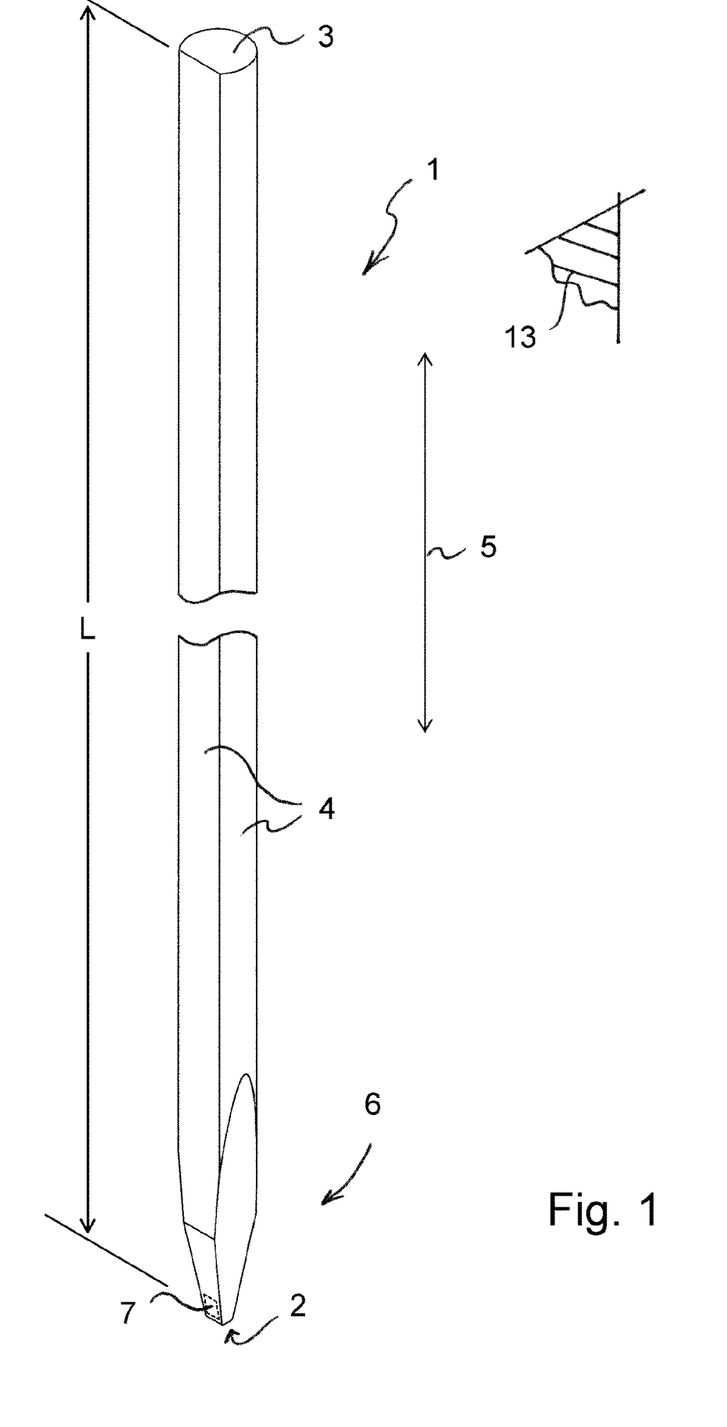
FIG. 1 is a perspective representation of a first embodiment of an ultrasonic tool, which is elongated in the longitudinal direction of a tool comprising an end region at which a surface-structured absorption surface is formed.

The ultrasonic tool 1 according to FIG. 1 provides a first end face 2 formed as a connecting contact surface, a second end face 3, which is opposite the first end face 2, and a tool cover surface 4 connecting the end faces 2, 3. The ultrasonic tool 1 is elongated in a longitudinal direction of the tool 5. It has a length L from the first end face 2 to the second end face 3, which is greater than 50 mm. With respect to the longitudinal direction of the tool 5, the lower 15 mm of the ultrasonic tool 1 comprising the connecting contact surface 2 form an end region 6 of the ultrasonic tool 1. In the end region 6, the ultrasonic tool 1 tapers in a wedge-shaped manner in respect of a cross-section oriented vertically to the longitudinal direction of the tool 5 in the direction of the connecting contact surface 2. The ultrasonic tool 1 is symmetrically designed in relation to a longitudinal center plane of the tool 13 which receives the longitudinal direction of the tool 5.

The connecting contact surface 2 is substantially perpendicular to the longitudinal direction of the tool 5. The connecting contact surface 2 is used to support or press a connecting component against the ultrasonic tool 1.

Figures 2, 3:
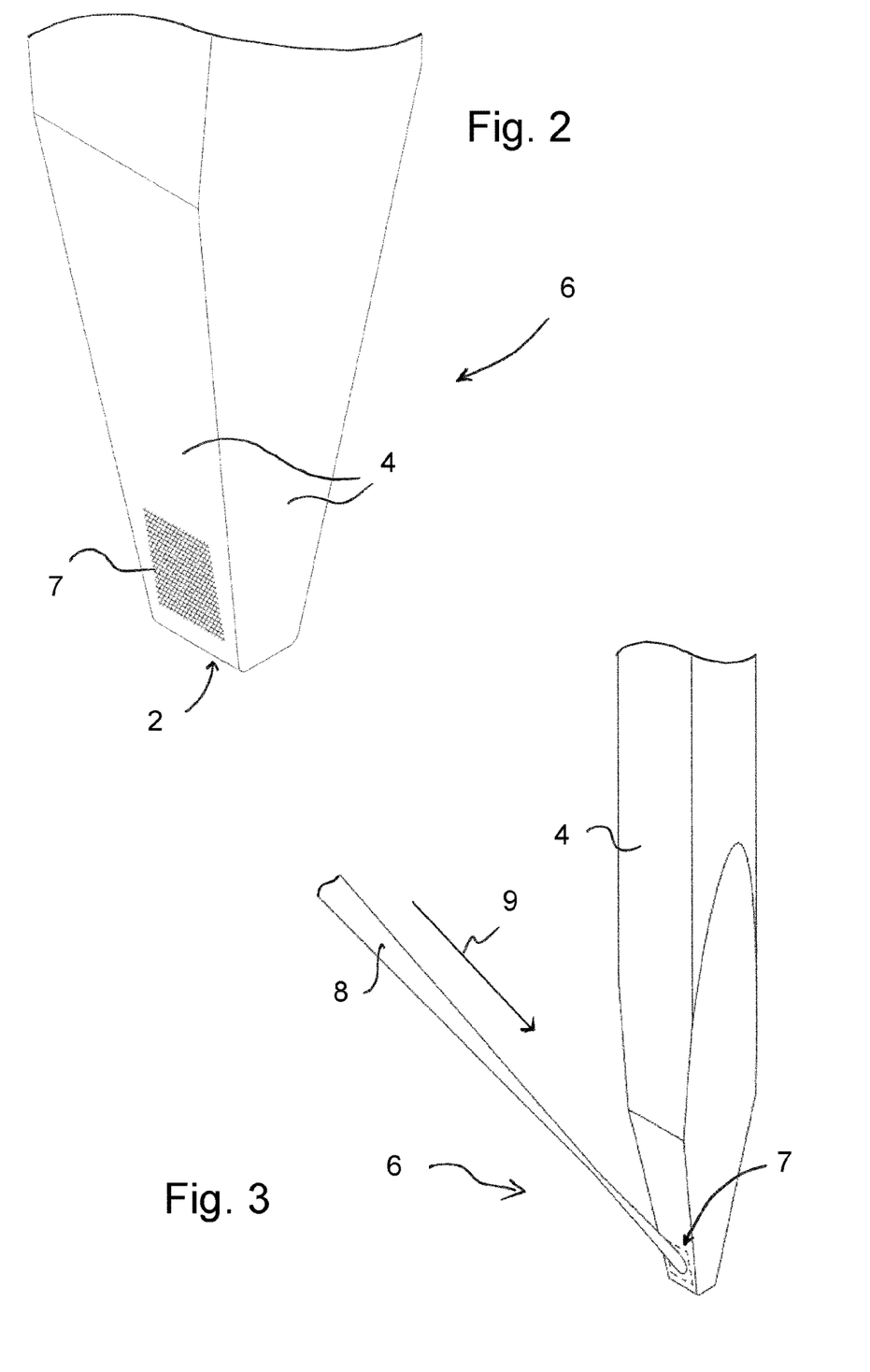
FIG. 2 is an enlarged view of the end region of the ultrasonic tool according to FIG. 1 comprising the absorption surface.
FIG. 3 is the end region of the ultrasonic tool according to FIGS. 1 and 2, wherein a laser beam divergently impinges on the absorption surface.

In the end region 6, a microstructured absorption surface 7 is provided on the tool cover surface 4 at a distance from the connecting contact surface 2. The absorption surface 7, which is shown enlarged in FIG. 2, is formed by grooved microstructures, which in the present case are regularly structured, parallel to each other in two groups and arranged intersecting at an angle of 45°. The microstructures have a depth T of about 10 μm and a width B or a distance that is about half the depth T.

Due to the microstructuring of the tool cover surface 4, the absorption coefficient of the absorption surface is 7 greater than the absorption coefficient of the tool cover surface 4 outside the absorption surface 7. Typically, the absorption coefficient of the absorption surface 7 is in the range of 0.9 or more.

FIG. 3 shows a divergent laser beam 8, which is directed obliquely from above at an acute angle with respect to the longitudinal direction of the tool 5 onto the absorption surface 7 of the ultrasonic tool 1 formed in the end region 6 and heats the ultrasonic tool 1 in the area of the connecting contact surface 2. The incidence direction 9 of the laser beam 8 is oblique to the tool cover surface 4, which means that the laser beam does not impinge on the absorption surface 7 vertically.

Figure 4:
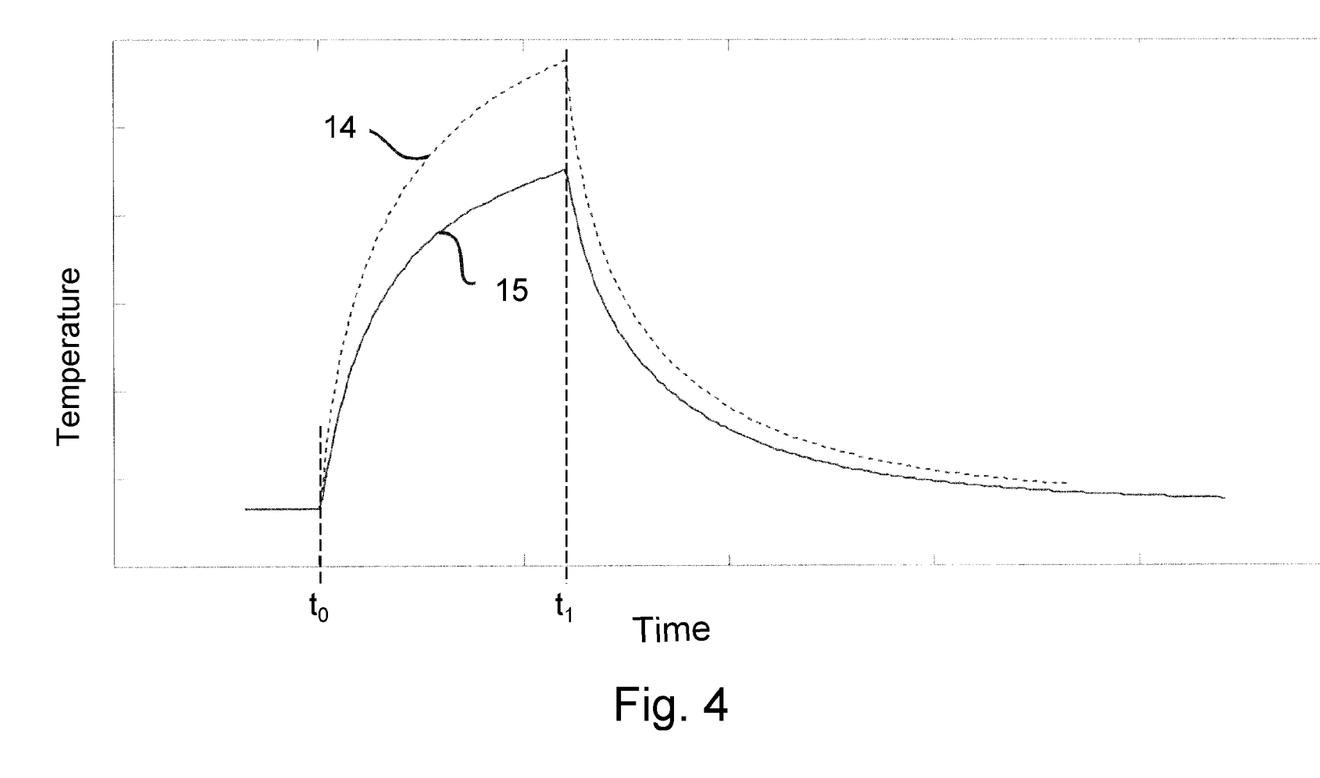
FIG. 4 is a comparison between heating curves for the ultrasonic tool according to FIGS. 1 to 3 and a conventional ultrasonic tool without absorption surface.

FIG. 4 shows two temperature curves over time. Graph 14, represented by a dashed line, shows the temperature curve for the ultrasonic tool 1 according to FIG. 1. Compared to this, Graph 15, represented by the solid line, shows the temperature curve for an ultrasonic tool without an absorption surface that is identical in terms of macroscopic geometry and material.

Both ultrasonic tools 1 are irradiated by a laser beam 8 having the same wavelength, equal focusing and positioning and having the same, constant power. At the time to, the laser beam 8 is switched on and at the time $t_1$, it is switched off. Starting from an ambient temperature, the two ultrasonic tools are heated by the laser beam 8.

The contrasting temperature curves clearly show that the heating of the inventive ultrasonic tool 1 with the absorption surface 7 is faster and that the inventive ultrasonic tool 1 is heated to a higher temperature than the conventional ultrasonic tool.

Figure 5:
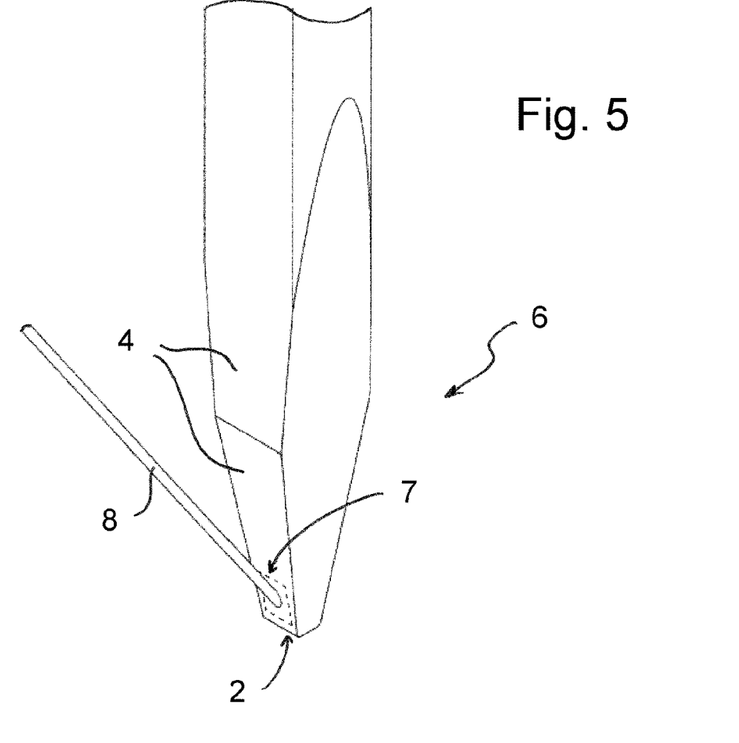
FIG. 5 is the end region of the ultrasonic tool according to FIGS. 1 to 3 comprising a collimated laser beam.
Figure 6:
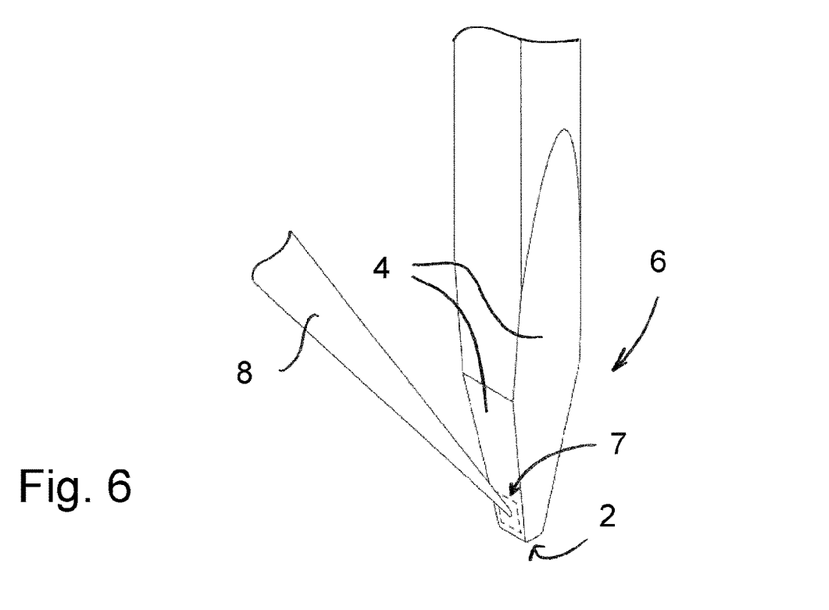
FIG. 6 is the end region of the ultrasonic tool according to FIG. 2, wherein a laser beam convergently impinges on the absorption surface.

The ultrasonic tool 1 can be heated as shown by means of a laser beam 8 divergently impinging on the absorption surface 7. Alternatively, the ultrasonic tool 1—as shown in FIG. 5—can be irradiated with a collimated laser beam 8 or—as shown in FIG. 6—with a convergent laser beam 8.

Figure 7:
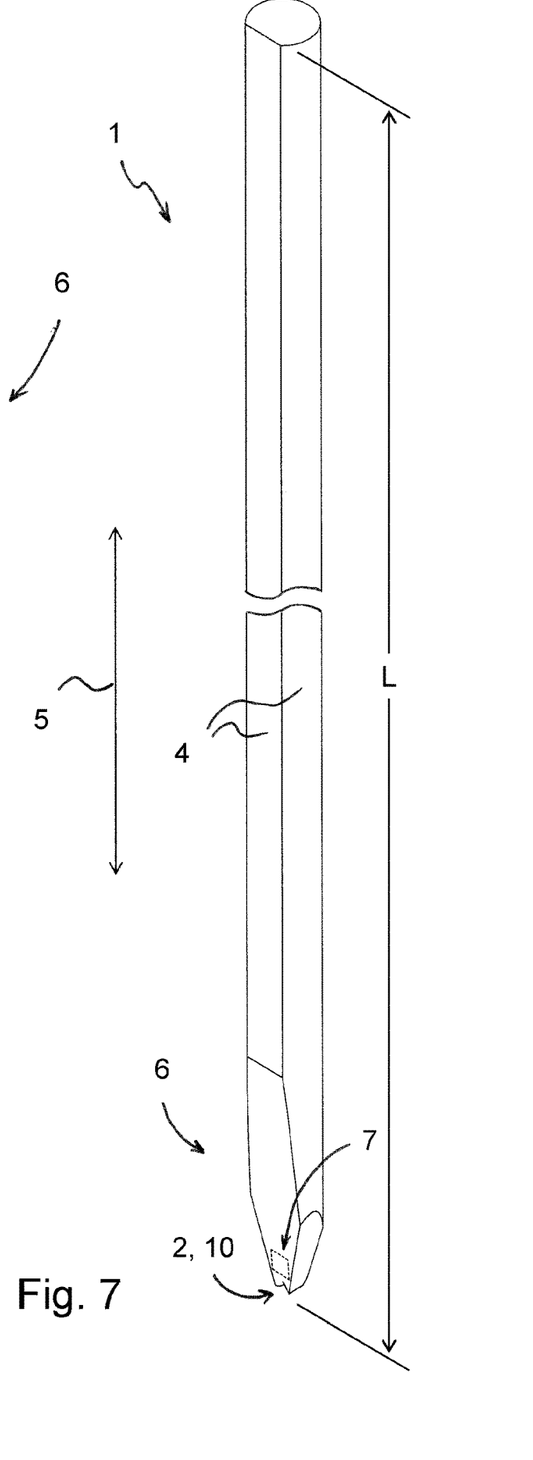
FIG. 7 is a perspective view of a second embodiment of the ultrasonic tool, which provides a contact contour for a connecting component on a connecting contact surface provided in the end region.
Figure 8:
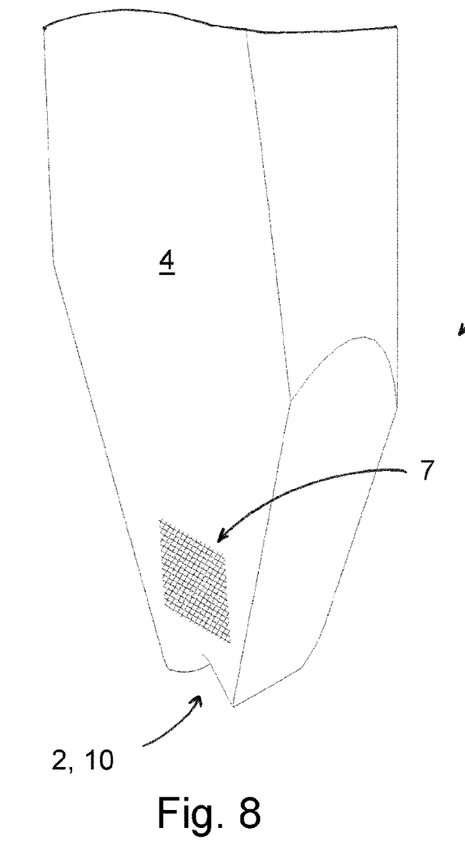
FIG. 8 is an enlarged view of the end region of the ultrasonic tool according to FIG. 7, FIGS. 9A to 9D are an exemplary compilation of different types of surface structuring of the absorption surface.

FIGS. 7 and 8 show a second embodiment of the ultrasonic tool 1. The ultrasonic tool 1 according to FIG. 7 corresponds in large parts to the ultrasonic tool 1 in the first embodiment. However, in the area of the connecting contact surface 2, a V-shaped contact contour, which extends transversely to the longitudinal direction of the tool 5, for a bond wire is provided as a connecting component. During the preparation of a bond connection, the bond wire is provided in the V-shaped contact contour 10 and is pressed against a substrate.

Figure 9A:
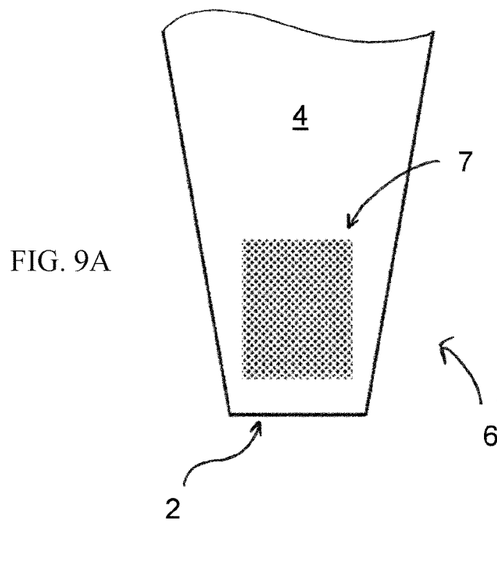
Figure 9B:
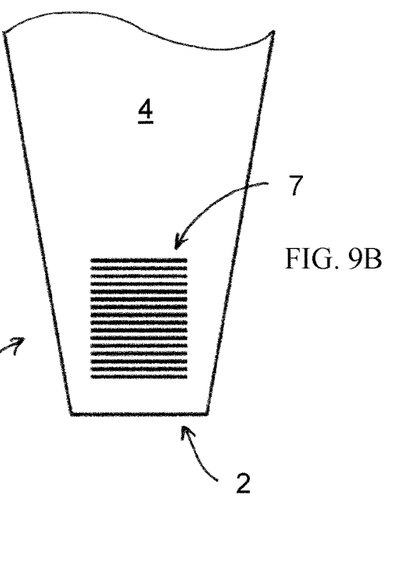
Figure 9C:
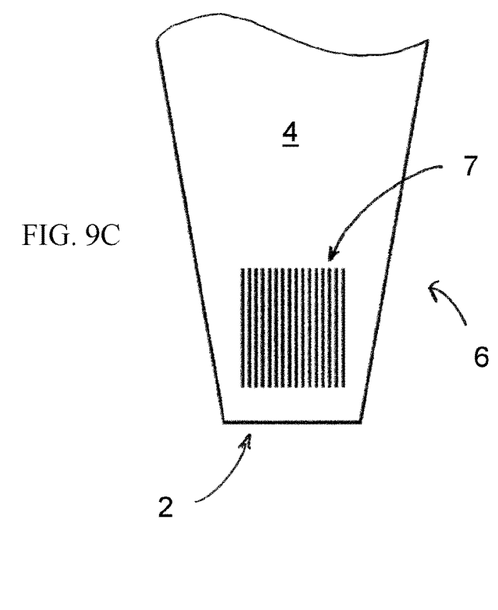
Figure 9D:
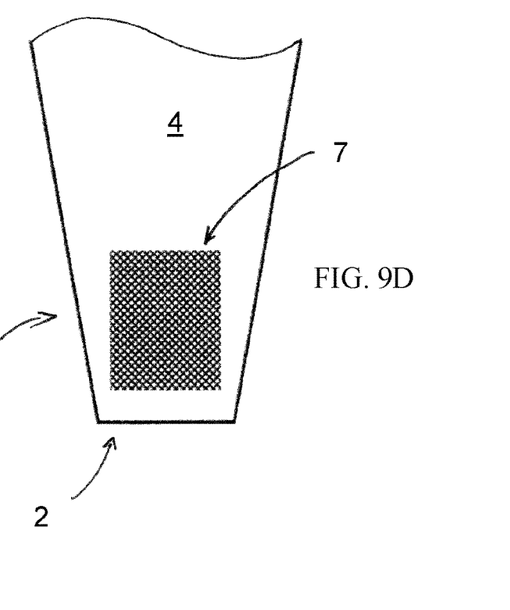

FIGS. 9A-9D shows different types of microstructuring of the absorption surface 7. In FIG. 9A, the microstructured absorption surface 7 is formed by individual dot-shaped depressions or hollows. In contrast, the microstructure in FIG. 9B is formed by grooves that are oriented transversely to the longitudinal length of the tool 5, i.e., horizontally extended as is customary in the intended use of the ultrasonic tool 1. FIG. 9C also shows grooved microstructures of the absorption surface 7, which are arranged rotated by 90° as compared to the horizontal arrangement according to FIG. 9B. Finally, FIG. 9D shows grooved microstructures in which the grooves are arranged at 45° and crosswise.

Figure 10:
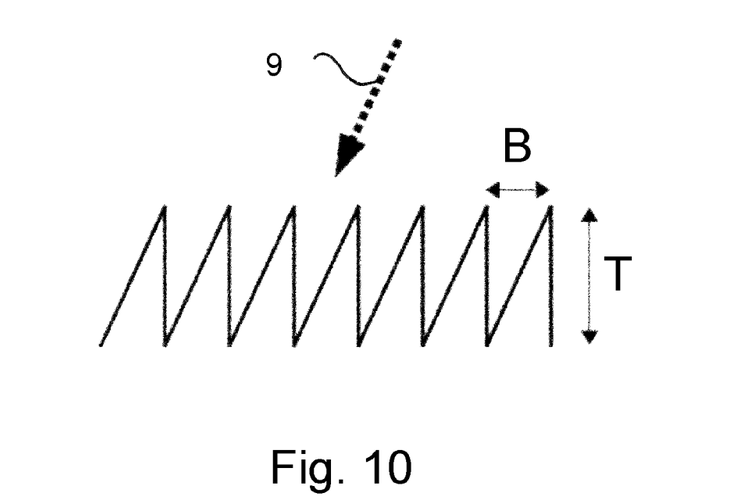
FIG. 10 is a schematic diagram of a geometry of the surface structure.

FIG. 10 exemplifies a grooved surface structuring formed by a plurality of right triangles formed the same in cross-section. The depth T of the surface structures established vertically to the tool cover surface is greater than 1 µm. Preferably, the depth T of the surface structures is greater than 10 µm. A maximum depth T of the surface structures is 350 µm. These are therefore microstructures in the present example. The width B of the microstructures is preferably at most half the width of depth T.

Figure 11:
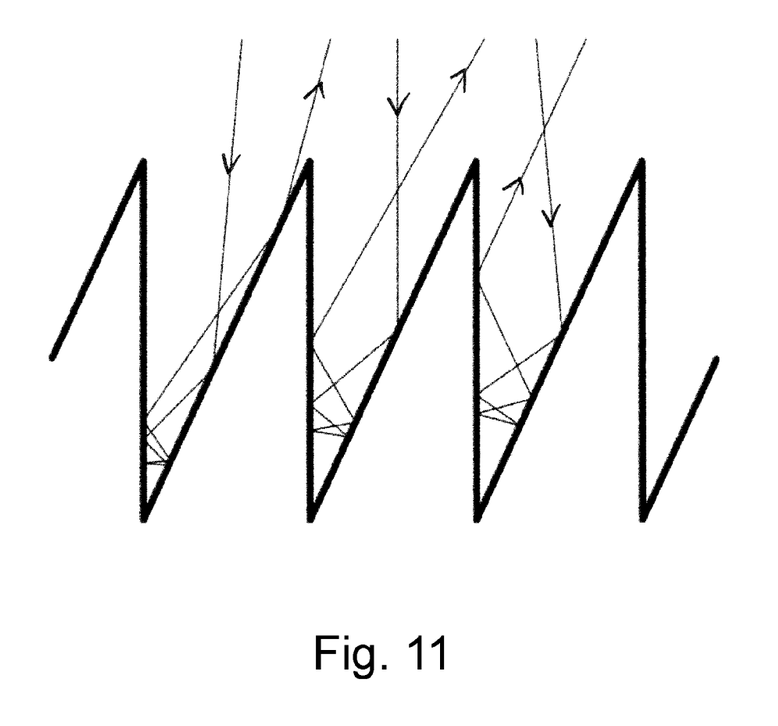
FIG. 11 is various exemplary beam paths for the laser beam impinging on the surface structure.

FIG. 11 shows an enlarged sectional view of the microstructure according to FIG. 10, comprising three divergent laser beams impinging on the microstructure. The incident laser beams are repeated and, in the present example, partially reflected six to seven times when impinging on the absorption surface 7. After the repeated reflection, the laser beams leave the absorption surface 7 diffusely reflected and having a power that is orders of magnitude lower due to the repeated absorption.

Figure 12A:
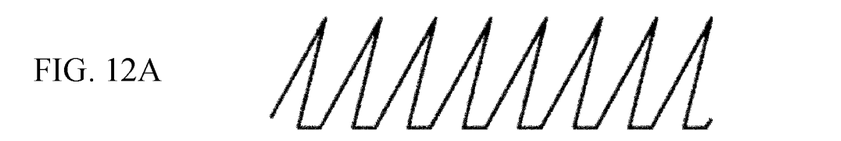
FIGS. 12A to 12E are various exemplary types of surface structuring of the absorption surface in cross-section.
Figure 12B:
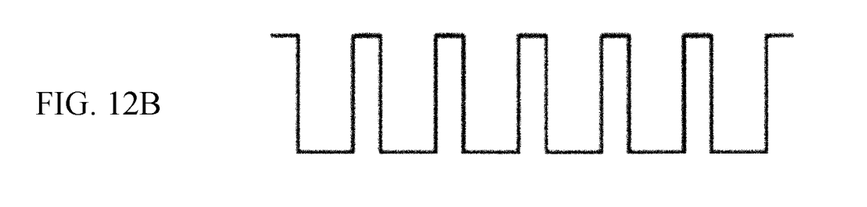
Figure 12C:
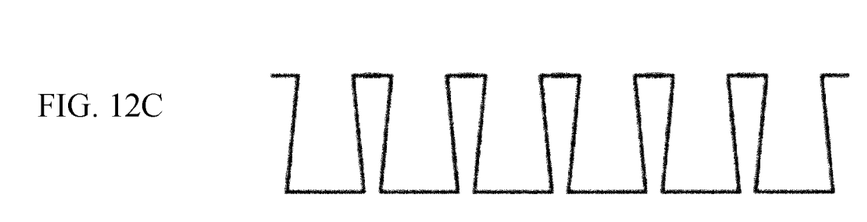
Figure 12D:
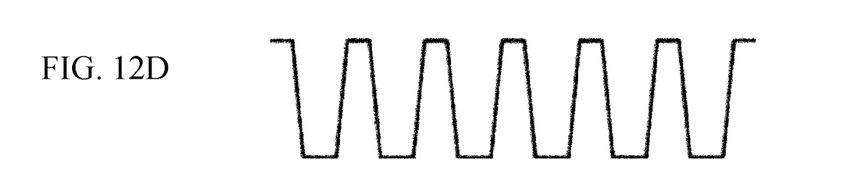
Figure 12E:
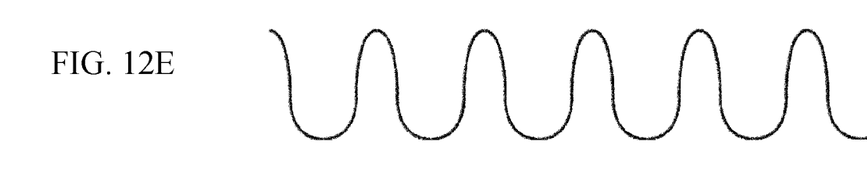

FIGS. 12A-12E show a selection of different regular microstructures in cross-section. While FIGS. 12A, 12B, 12C and 12D show idealized geometries, FIG. 12E shows an example of a real microstructured absorption surface 7 produced by laser ablation with less sharp, rounded contour transitions.

The microstructures shown in FIGS. 9 to 12 are only examples. In principle, the microstructures can be freely designed. The microstructures can, for example, be regular or irregular or have an unspecified shape and/or variable structuring. Application-specific, material-dependent, and dependent on the operating parameters of the laser beam, the microstructure of the absorption surface can be designed in particular in such a way that there is a high and preferably regular absorption across the surface, and inadmissible local temperature peaks are avoided.

Figure 13:
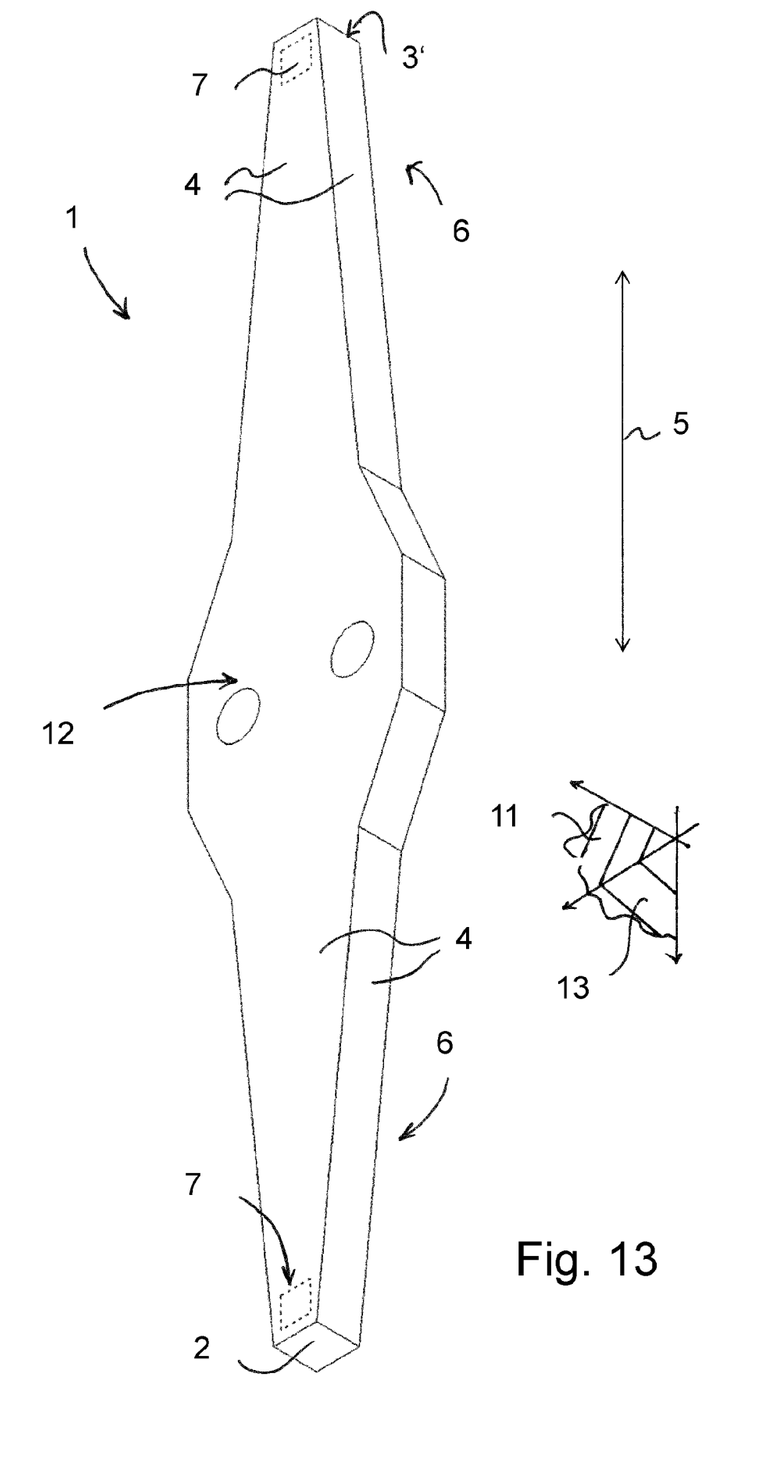
FIG. 13 is a perspective view of a third embodiment of an ultrasonic tool, which is symmetrically formed in respect of a cross-section plane which is oriented perpendicular to the longitudinal direction of the tool.
Figure 14:
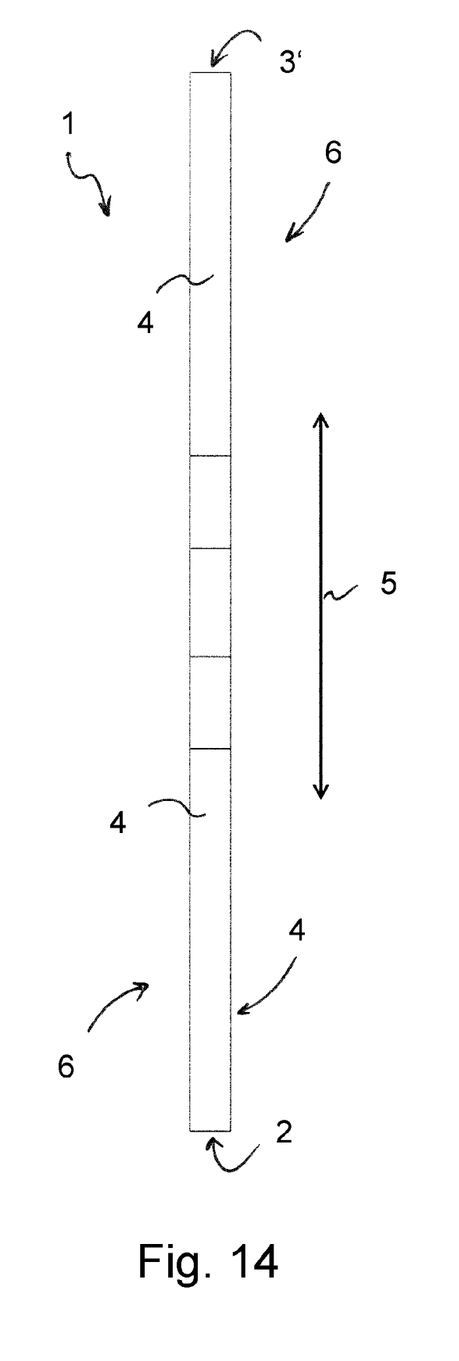
FIG. 14 is a side view of the ultrasonic tool according to FIG. 13.
Figure 15:
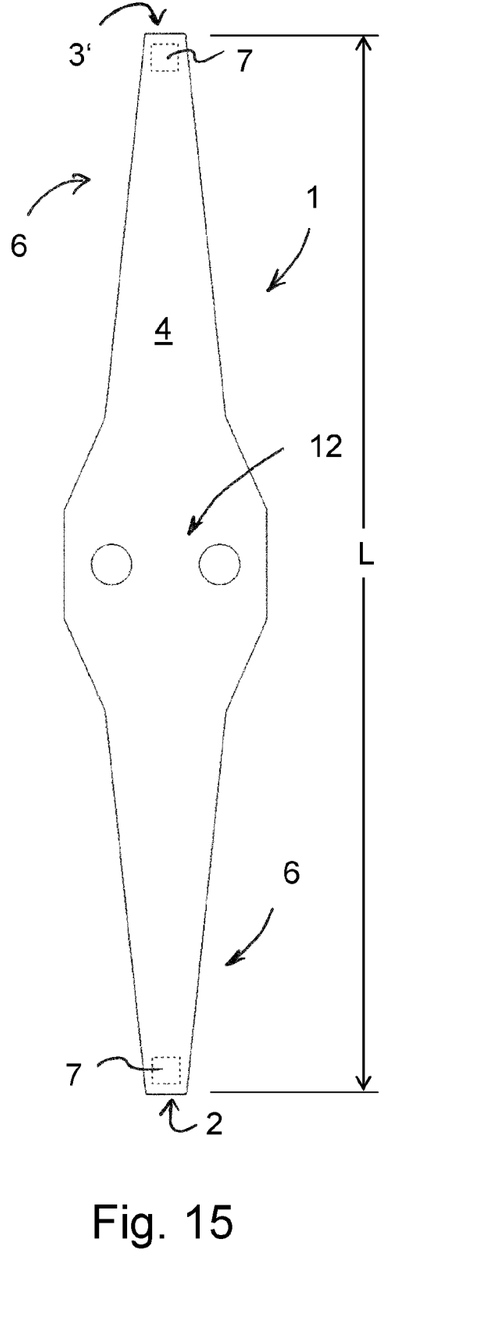
FIG. 15 is a front view of the ultrasonic tool according to FIG. 13.

FIGS. 13 to 15 show a third embodiment of the inventive ultrasonic tool 1. The ultrasonic tool 1 is formed as an ultrasonic welding tool, which is formed symmetrically in respect of a transverse median plane 11 oriented perpendicular to the longitudinal direction of the tool 5. In addition, it is formed, as before, symmetrical in respect of the longitudinal center plane of the tool 13 which receives the longitudinal direction of the tool 5. The ultrasonic tool 1 provides a receptacle 12, which is designed in such a way that the ultrasonic tool 1 can be used in two orientations rotated by 180°. In this respect, it is an ultrasonic turning tool 1.

In the present ultrasonic tool 1, as before, the first end face 2 and additionally also the second end face 3' of the ultrasonic tool 1 are formed as a connecting contact surface. In each case, the ultrasonic tool 1 tapers in the direction of the connecting contact surface 2, 3'. Each connecting contact surface 2, 3' is part of an end region 6. From the connecting contact surfaces 2, 3', the two opposing end regions 6 extend 15 mm in the longitudinal direction of the tool 5. They each provide an absorption surface 7, which is positioned adjacent to the first end face 2 or adjacent to the second end face 3'.

Figure 16:
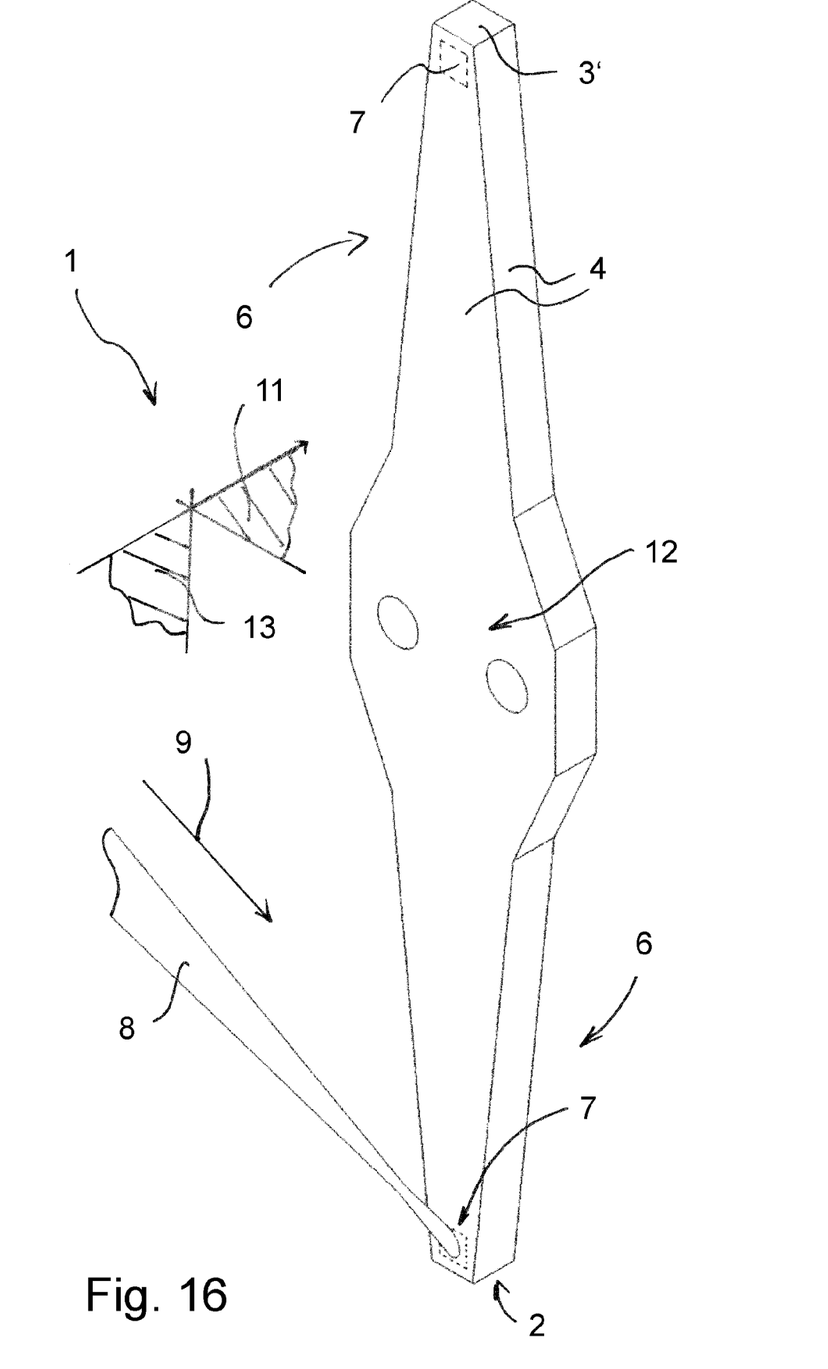
FIG. 16 is the ultrasonic tool according to FIG. 13 comprising a laser beam divergently impinging on the absorption surface.

FIG. 16 shows how the laser beam 8 impinges on the absorption surface 7 associated with the first end face 2. The laser beam 8 heats the end region 6 with the connecting contact surface 2. In this case, the laser beam 8 is oriented in such a way that the incidence direction 9 of the laser beam 8 forms an acute angle with the longitudinal direction of the tool 5.

In principle, the representation of the geometry in the present case is only exemplary. Even if the surface structures are realized as microstructures in the discussed embodiments, macrostructures with a depth of more than 350 µm can also define the absorption surface.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An ultrasonic tool comprising:
a first end face;
a second end face arranged opposite to the first end face;
a tool cover surface connecting the first end face and the second end face,
wherein the ultrasonic tool is elongated in a longitudinal direction of the tool,
wherein at least the first end face is formed as a connecting contact surface, which is arranged for pressing the ultrasonic tool against a connecting component,
wherein the ultrasonic tool further comprises an end region, that extends from the connecting contact surface in the longitudinal direction of the tool over 15 mm, but at most extends one third of the length of the ultrasonic tool in the direction opposite to the end face,
wherein, in the end region, a first partial surface of the tool cover surface is formed as an absorption surface configured to absorb and/or diffusely reflect a laser beam,
wherein an absorption coefficient of the absorption surface is greater than an absorption coefficient of a second partial area of the tool cover surface adjacent to the absorption surface and/or an absorption coefficient of the tool cover surface outside the end region,
wherein the surface structure of the absorption surface is formed as a microstructure, and
wherein the roughness of the first partial surface forming the absorption surface is greater than the roughness of the second partial surface of the tool cover surface.

2. An ultrasonic tool comprising:
a first end face;
a second end face arranged opposite to the first end face;
a tool cover surface connecting the first end face and the second end face,
wherein the ultrasonic tool is elongated in a longitudinal direction of the tool,
wherein at least the first end face is formed as a connecting contact surface, which is arranged for pressing the ultrasonic tool against a connecting component,
wherein the ultrasonic tool further comprises an end region that extends from the connecting contact surface in the longitudinal direction of the tool over 15 mm, but at most extends one third of the length of the ultrasonic tool in the direction opposite to the end face,
wherein, in the end region, a first partial surface of the tool cover surface is formed as an absorption surface,
wherein the absorption surface comprises grooved surface structures and/or dot-shaped surface structures and/or wherein the absorption surface is regularly structured, and
wherein the grooved surface structures are arranged parallel structured and/or cross-structured and/or the grooved surface structures extend transversely to the longitudinal direction of the tool.

3. The ultrasonic tool according to claim 1, wherein a depth of the microstructures determined vertically to the tool cover surface is greater than 1 μm or in the range of 10 μm to 350 μm.

4. The ultrasonic tool according to claim 1, wherein the absorption surface is macroscopically flat and/or the absorption surface is oriented oblique to the longitudinal direction of the tool and/or wherein, like the first partial surface, the second partial surface is provided in the end region.

5. The ultrasonic tool according to claim 1, wherein the absorption surface comprises a coating.

6. The ultrasonic tool according to claim 1, wherein the absorption surface is symmetrically oriented with respect to a median longitudinal surface of the tool, which receives the longitudinal direction of the tool and/or wherein the median longitudinal surface of the tool is formed as a symmetry surface of the ultrasonic tool and/or wherein the ultrasonic tool is symmetrically formed with respect to a transverse median surface which is oriented perpendicular to the longitudinal direction of the tool, and wherein the second end face is also formed as a connecting contact surface.

7. The ultrasonic tool according to claim 1, wherein a contact contour is provided on the at least one connecting contact surface and/or wherein, in the end region and with respect to a cross-section oriented perpendicular to the longitudinal direction of the tool, and wherein at least sections of the ultrasonic tool taper towards the connecting contact surface.

8. The ultrasonic tool according to claim 1, wherein the absorption surface is prepared by wire EDM and/or by die-sinking EDM and/or by electrochemical ablation and/or by engraving and/or by laser ablation and/or primary forming and/or wherein the ultrasonic tool is formed of a carbide or steel or a ceramic or a tungsten carbide-based carbide or boron nitride or comprises tungsten carbide in a cobalt matrix.

9. An ultrasonic connection device for ultrasonic welding and/or ultrasonic bonding, comprising:
an ultrasonic tool according to claim 1, comprising at least one absorption surface formed on the tool cover surface;
an ultrasonic generator and a transducer, wherein the ultrasonic generator excites the transducer to vibrate, and the transducer interacts with the ultrasonic tool such that the ultrasonic tool is excitable to ultrasonic vibrations and preferably to ultrasonic bending vibrations; and
a laser generator for providing the laser beam;
wherein the laser beam is aligned with the end region of the ultrasonic tool such that the laser beam completely or at least partially impinges on the absorption surface of the ultrasonic tool.

10. The ultrasonic connection device according to claim 9, wherein the surface structure of the absorption surface is formed as a microstructure and that the depth of the microstructure is greater than a wavelength of the laser beam and is greater than the wavelength of the laser beam by a factor of 10 or more.

11. The ultrasonic connection device according to claim 10, wherein the wavelength of the laser beam is matched to a material of the ultrasonic tool and/or a macroscopic geometry of the surface structure and/or a coating in such a way that, for the absorption surface, an absorption coefficient is at least 0.81 or 0.86 or at least 0.9.

12. The ultrasonic connection device according to claim 9, wherein the laser beam is aligned such that it impinges on the absorption surface in an oblique or non-perpendicular manner.

13. The ultrasonic connection device according to claim 9, wherein the absorption coefficient of the surface-structured absorption surface varies as a function of an angle of incidence of the laser beam.

14. The ultrasonic tool according to claim 1, wherein the depth of the microstructures established vertically to the tool cover surface is greater than 10 μm to 350 μm.

15. The ultrasonic connection device according to claim 11, wherein the absorption surface has an absorption coefficient of at least 0.81.

16. An ultrasonic tool comprising:
a first end face having a connecting contact surface configured to press against a connecting component;
a second end face arranged opposite to the first end face;
a tool cover surface connecting the first end face and the second end face, the tool cover surface being elongated in a longitudinal direction; and
an end region extending from the connecting contact surface in the longitudinal direction more than 15 mm, but not more than one third of the length of the ultrasonic tool, wherein, in the end region, a first partial surface of the tool cover surface is formed as an absorption surface configured to absorb and/or diffusely reflect a laser beam,
wherein the absorption surface comprises grooved surface structures arranged as parallel structures or cross structures or the grooved surface structures extend transversely to the longitudinal direction of the ultrasonic tool.

17. The ultrasonic tool according to claim 2, wherein the surface structure of the absorption surface is formed as a microstructure, wherein the roughness of the first partial surface forming the absorption surface is greater than the roughness of the second partial surface of the tool cover surface and/or wherein a depth of the microstructures determined vertically to the tool cover surface is greater than 1 µm or in the range of 10 µm to 350 µm.

18. The ultrasonic tool according to claim 2, wherein the absorption surface is macroscopically flat and/or the absorption surface is oriented oblique to the longitudinal direction of the tool and/or wherein, like the first partial surface, the second partial surface is provided in the end region.

19. The ultrasonic tool according to claim 2, wherein the absorption surface comprises a coating.

20. The ultrasonic tool according to claim 2, wherein the absorption surface is symmetrically oriented with respect to a median longitudinal surface of the tool, which receives the longitudinal direction of the tool and/or wherein the median longitudinal surface of the tool is formed as a symmetry surface of the ultrasonic tool and/or wherein the ultrasonic tool is symmetrically formed with respect to a transverse median surface which is oriented perpendicular to the longitudinal direction of the tool, and wherein the second end face is also formed as a connecting contact surface.

21. The ultrasonic tool according to claim 2, wherein a contact contour is provided on the at least one connecting contact surface and/or wherein, in the end region and with respect to a cross-section oriented perpendicular to the longitudinal direction of the tool, and wherein at least sections of the ultrasonic tool taper towards the connecting contact surface.

22. The ultrasonic tool according to claim 2, wherein the absorption surface is prepared by wire EDM and/or by die-sinking EDM and/or by electrochemical ablation and/or by engraving and/or by laser ablation and/or primary forming and/or wherein the ultrasonic tool is formed of a carbide or steel or a ceramic or a tungsten carbide-based carbide or boron nitride or comprises tungsten carbide in a cobalt matrix.

23. The ultrasonic tool according to claim 2, wherein the depth of the microstructures established vertically to the tool cover surface is greater than 10 µm to 350 µm.

\* \* \* \* \*